United States Patent [19]
Artzberger

[11] Patent Number: 5,149,225
[45] Date of Patent: Sep. 22, 1992

[54] REVERSIBLE DRIVE FOR A VIBRATORY COMPACTOR

[75] Inventor: Thomas G. Artzberger, Menomonee Falls, Wis.

[73] Assignee: M-B-W Inc., Singer, Wis.

[21] Appl. No.: 668,771

[22] Filed: Mar. 13, 1991

[51] Int. Cl.$^5$ .................... E01C 19/36; F16H 33/00
[52] U.S. Cl. ................................. 404/133.1; 74/61
[58] Field of Search ........... 404/133.05, 133.1, 133.2; 74/61; 336/128

[56] References Cited

U.S. PATENT DOCUMENTS

| | | | |
|---|---|---|---|
| 3,730,037 | 5/1973 | Purrer | 74/213 X |
| 3,753,621 | 8/1973 | Dale | 404/116 |
| 4,133,225 | 1/1979 | Love | 74/377 X |
| 4,237,983 | 12/1980 | Allen | 74/355 X |
| 4,499,779 | 2/1985 | Maass | 404/133.1 |

Primary Examiner—Ramon S. Britts
Assistant Examiner—Nancy P. Connelly
Attorney, Agent, or Firm—Andrus, Sceales, Starke & Sawall

[57] ABSTRACT

An improved drive mechanism for a reversible walk-behind soil compactor. The compactor includes a frame which carries a soil compacting plate and a drive mechanism, such as a gasoline engine is mounted on the frame and has a rotatable drive shaft. A pair of eccentrically weighted shafts are mounted for rotation on the frame and a belt drive connects each eccentric shaft with the drive shaft in a manner to rotate the eccentric shafts in opposite directions. Each belt drive is connected through a clutch to the drive shaft and the clutch is arranged such that each eccentric shaft is individually engaged with the drive shaft. Through manual operation of the clutch, the eccentric shafts are selectively rotated to thereby move the compactor in a forward or reverse direction over the soil to be compacted.

10 Claims, 2 Drawing Sheets

REVERSIBLE DRIVE FOR A VIBRATORY COMPACTOR

BACKGROUND OF THE INVENTION

A conventional walk-behind reversible soil compactor includes a frame that carries a generally horizontal compaction plate which is adapted to engage and compact the soil, or other material. To provide a vibratory compacting action, a pair of shafts are journaled for rotation on the frame and each shaft carries an eccentric weight. A power source, such as a gasoline engine, is mounted on the frame and the drive shaft of the engine is connected to the eccentric shafts through a gear system which is arranged so that the eccentric shafts rotate simultaneously and in opposite directions.

To provide forward and rear movement for the compactor, the phase relationship of the weights on the eccentric shafts is changed by a shifting mechanism. The shifting mechanism, as used with a conventional walk-behind compactor, is very complex, and as the shifting mechanism is directly associated with the eccentric shafts, the shifting mechanism is subjected to intense vibration and therefore has a relatively short service life.

As a further problem, as the eccentric shafts are continuously rotating in opposite directions, torque generated by one shaft will oppose the torque generated by the second eccentric shaft. Because of this and the increased weight resulting from the shifting mechanism, the speed of travel of the compactor over the soil is substantially reduced over a similarly powered unidirectional compactor.

Therefore, the reversible walk-behind, vibratory soil compactors as used in the past, have been relatively expensive due to the requirement of a complex shifting mechanism, have had a relatively low speed of travel, and have been subject to high maintenance costs.

SUMMARY OF THE INVENTION

The invention is directed to an improved reversible, walk-behind, vibratory soil compactor. The compactor includes a frame which carries a compactor plate that is adapted to engage and compact the soil, or other material. A pair of eccentrically weighted shafts are journaled for rotation on the frame and an individual belt drive connects each eccentric shaft with the drive shaft of an engine that is mounted on the frame, such that the eccentric shafts rotate in opposite directions.

A clutch mechanism is associated with the drive shaft and selectively connects each eccentric shaft via the respective belt drive to the drive shaft. By connecting one of the eccentric shafts to the drive shaft, the compactor will move in a forward direction and conversely, by connecting the other of the eccentric shafts to the drive shaft the compactor will move in a reverse direction.

The clutch mechanism is a unique construction and includes a first end clutch disc which is secured to the drive shaft of the engine and a second end clutch disc is also secured to the drive shaft and is spaced axially a fixed distance from the first end clutch disc. A third central clutch disc is located between the end discs and is mounted for sliding longitudinal movement relative to the drive shaft.

The central clutch disc can be moved axially by a manual shifting mechanism between a central neutral position, a first engaged position where one of the drive belts is clamped between the first end clutch disc and the central disc, and a second engaged position where the other of the belts is clamped between the second end clutch disc and the central disc. More specifically, the three clutch discs have lapping cylindrical hubs which are disposed concentrically around the drive shaft and a pin extends through aligned holes in the end clutch discs and the drive shaft, as well as through an elongated slot in the central disc. This connection fixes the end clutch discs to the drive shaft, while permitting axial movement of the central clutch disc relative to the drive shaft.

The projecting end of the hub of the central clutch disc is provided with a plurality of circumferentially spaced holes which receive balls, and the balls have a larger diameter than the thickness of the hub of the central clutch disc and each ball is adapted to engage one of a pair of depressions in the hub of the first end clutch disc to thereby lock the central clutch disc in one of two engaged positions. The shifting mechanism comprises an outer sleeve that has an internal circumferential groove. When the inner surface of the sleeve is in registry with the balls, the balls will be held in the depressions of the hub of the first end clutch disc to lock the central clutch disc in one of the two engaged positions. By moving the sleeve axially, the internal circumferential groove of the sleeve will be brought into registry with the balls, and centrifugal force will move the balls radially outward into the groove, thus disengaging the central clutch disc and permitting the central clutch disc to move axially with the sleeve to the other engaged position where the central clutch disc is engaged with the second end clutch disc.

The invention utilizes simple belt drives to connect the drive shaft of the engine with the eccentric vibratory shafts. As one belt begins to tighten while the other belt loosens, a smooth shifting action is achieved with a lesser power requirement.

As only one belt is engaged at any instant, the torque generated by one eccentric shaft does not oppose or fight the torque generated by the second eccentric shaft as in a conventional compactor. This enables the speed of travel of the compactor to be substantially increased with the same power input, as compared to a conventional compactor.

As the shifting mechanism of the invention is not located in the vibratory zone, the shifting mechanism is not subjected to intense vibration and therefore has a substantially longer service life. With the shifting construction of the invention, the primary components subjected to wear are the belts, which can be readily replaced, if necessary.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
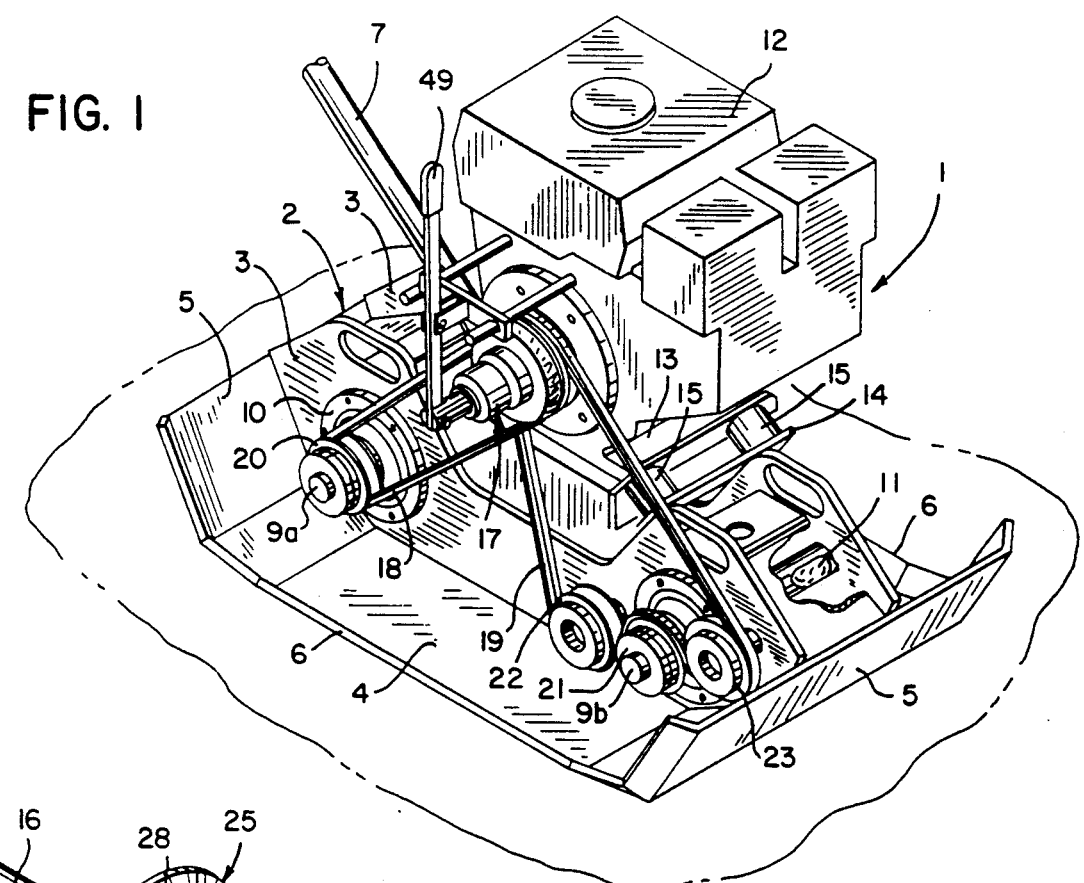
FIG. 1 is a perspective view of the compactor.
Figure 2:
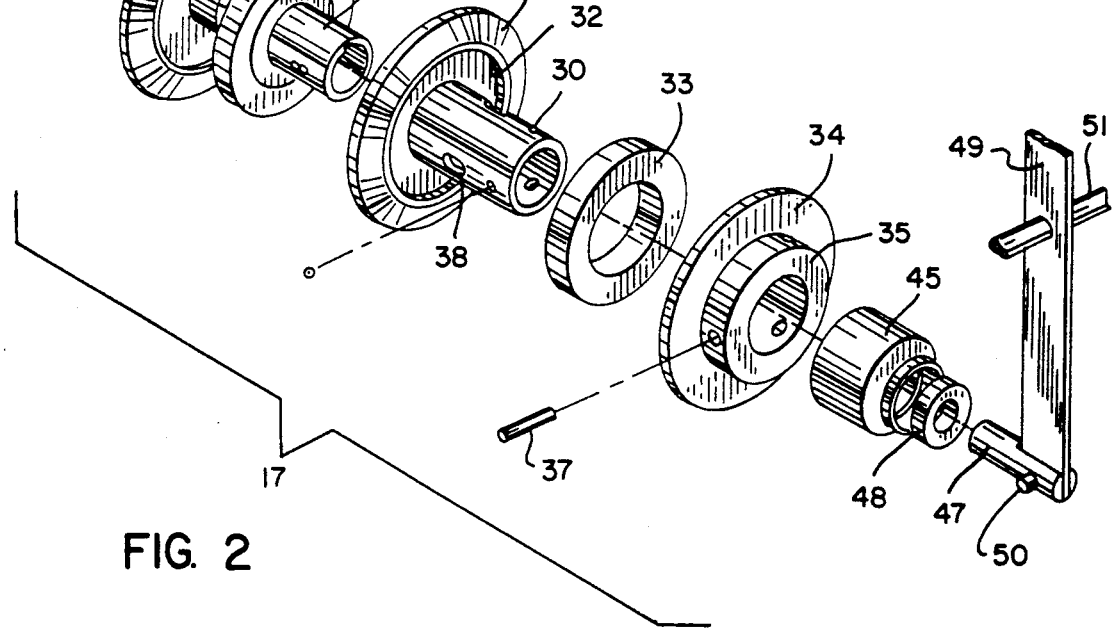
FIG. 2 is an exploded view of the clutch mechanism.

FIG. 1 shows a reversible, vibratory, walk-behind soil compactor 1, that can be used for compacting soil, or other material. Compactor 1 includes a frame 2 having a pair of spaced parallel side plates 3, the lower edges of which are secured to a compactor plate 4, which is adapted to engage the material to be compacted. The forward and rear ends of the compactor plate 4 are inclined upwardly, as indicated by 5, and each side edge of plate 4 is provided with an upturned flange 6. A handle 7, to be engaged by an operator, is connected to the frame 2.

A pair of vibratory shafts 9 are journaled in the side plates 3 of frame 2 by bearing assemblies 10 and each shaft 9 carries one or more eccentric weights 11. Rotation of the eccentric shafts 9 will provide a vibratory action for the compactor plate 4.

A power source, such as a gasoline engine 12, is supported on a mounting plate 13, and mounting plate 13 is connected to plates 14 of frame 2 through isolation mounts 15. Isolation mounts 15 are formed of a resilient material, such as rubber, and act to minimize the transmission of vibrations from frame 2 to the engine 12.

Engine 12 includes a horizontal drive shaft 16 and a clutch mechanism 17 selectively connects the drive shaft 16 to the eccentric shafts 9 through belts 18 and 19. As best shown in FIG. 1, belt 18, which has a generally V-shape cross section, is trained between the clutch 17 and a pulley 20 on one of the shafts 9a, while belt 19, which has a generally hexagonal cross section, connects the clutch with a pulley 21 mounted on the other of the shafts 9b and also passes around idler pulleys 22 and 23, as shown in FIG. 1. With this pulley arrangement, the shaft 9b will rotate in the opposite direction from shaft 9a. Operation of clutch 17, as will be hereinafter described, selectively connects either the shaft 9a or the shaft 9b to the drive shaft 16. Driving of shaft 9a will move the compactor in one direction, while driving of eccentric shaft 9b will move the compactor in the opposite direction.

Figure 3:
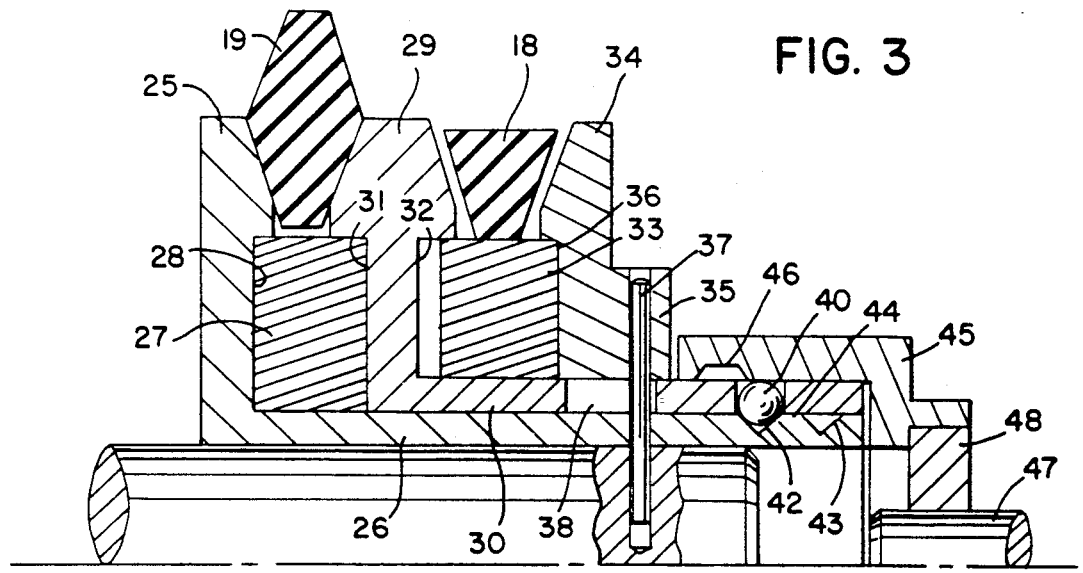
FIG. 3 is an enlarged fragmentary longitudinal section of the clutch mechanism showing the clutch in an engaged position.
Figure 4:
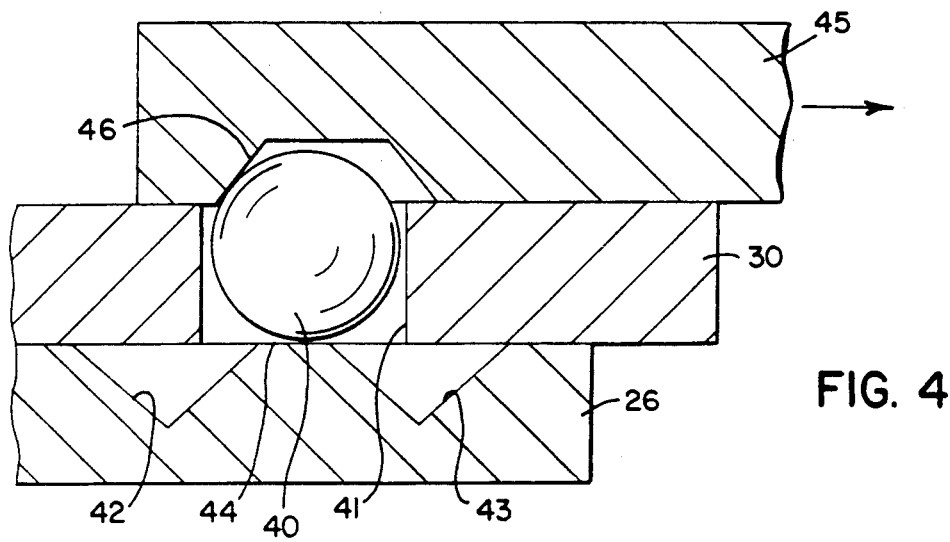
FIG. 4 is an enlarged fragmentary longitudinal section showing the clutch in a neutral position.
Figure 5:
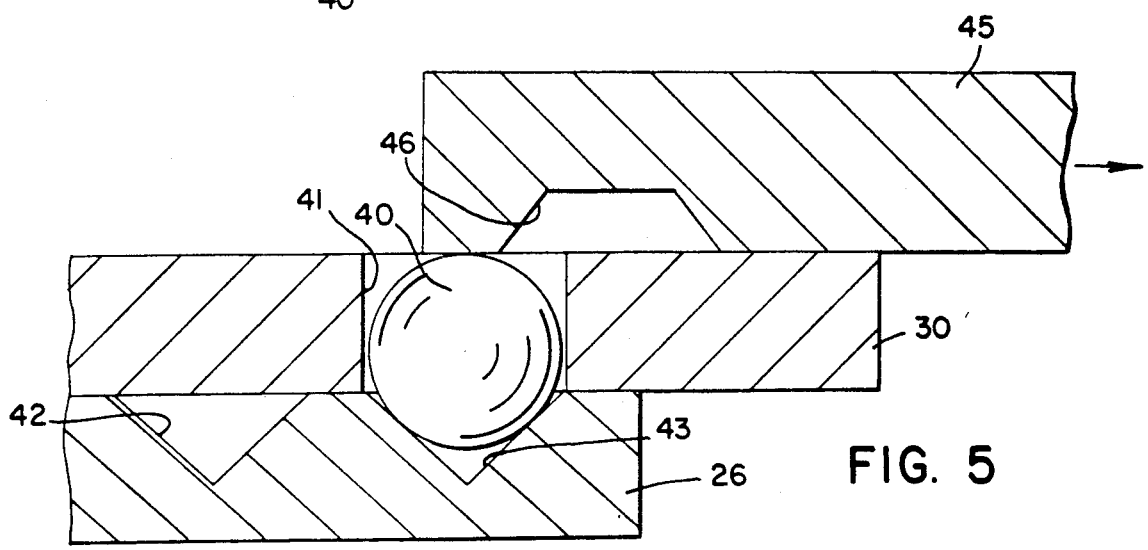
FIG. 5 is a view similar to FIG. 4 showing the clutch in a second engaged position.

The clutch mechanism is best illustrated in FIGS. 3-5, and includes an end clutch disc 25 having a cylindrical hub portion 26 which is keyed to drive shaft 16. As shown in FIG. 3, an annular bearing 27 is mounted on the hub portion 26 and the side portion of the bearing is received within an annular recess 28 in the disc 25.

Clutch 17 also includes a central clutch disc 29 having a hub portion 30 which is disposed concentrically outward of the hub portion 26 of clutch disc 25, as illustrated in FIG. 3. Both sides of central clutch disc 29 are formed with annular recesses 31 and 32 and recess 31 receives bearing 27 when the central disc 29 is moved to an engaged position as shown in FIG. 3. A second bearing 33 is mounted around the hub portion 30 of central clutch disc 29, as shown in FIG. 3.

A second end clutch disc 34 is mounted in fixed relation with respect to end clutch disc 25 and is provided with a cylindrical hub portion 35 which is located concentrically outward of the hub portion 30 of central disc 29. One side or face of clutch disc 34 is formed with an annular recess 36 that receives the bearing 33.

To lock the discs 25 and 34 to shaft 16, a pin 37 extends through aligned holes in hub portions 26 and 35 of discs 25 and 34, as well as through an elongated slot 38 in the hub portion 30 of central disc 29. With this connection, the discs 25 and 34 are secured to drive shaft 16 and rotate therewith, while the central clutch disc 29 is slidable relative to the clutch discs 25 and 34, but also rotates with shaft 16.

The central disc 29 can be shifted between a neutral position and two engaged positions. In one engaged position, as shown in FIG. 3, the belt 19 will be engaged or clamped between the discs 25 and 29 to provide a driving connection between the drive shaft 16 and belt 19, and in the other engaged position, belt 18 will be clamped between the central disc 29 and end clutch disc 34 to provide a driving connection between the drive shaft 16 and belt 18. When one of the belts is disengaged, as shown by belt 18 in FIG. 3, the disengaged belt will ride on the bearing 33.

To lock the central clutch disc 29 in either the engaged positions a ball lock mechanism is employed which includes a plurality of circumferentially spaced balls 40, each of which is located within a hole 41 in the projecting hub portion 30 of the central disc 29. As shown in the drawings, three balls 40 are utilized which are spaced 120° around hub portion 30. Each ball 40 has a greater diameter than the thickness of hub portion 30 and when in a locking position, each ball is adapted to engage one of a pair of depressions or notches 42,43 which are located in the hub portion 26 of clutch disc 25. A land 44 is located between each pair of depressions 42,43 and when the ball registers with the land 44, as shown in FIG. 4, the clutch is in a neutral or disengaged position.

A shifting sleeve 45 is employed to shift the balls between the notches 42 and 43. As shown in FIG. 3, sleeve 45 is located concentrically outward of hub portion 30 and is formed with an internal circumferential groove 46. The inner surface of sleeve 45 will hold each ball 40 in engagement with either notch 42 (as seen in FIG. 3) or with notch 43 (as seen in FIG. 5). To shift the clutch, sleeve 45 is moved axially of shaft 16 and when groove 46 registers with the balls 40, centrifugal force generated by the rotating drive shaft 16 will move the balls radially outward into groove 46, thereby locking sleeve 45 to the central clutch disc 29.

Continued axial movement of sleeve 45 will move balls 40 into registry with lands 44, as seen in FIG. 4, and the clutch will then be in a disengaged position, so that rotation of drive shaft 16 will not be transmitted to either of the belts 18 or 19. By continuing movement of the shifting sleeve 45 to the right, as shown in FIG. 5, the balls 40 will fall into the depressions 43. Further movement of the shifting sleeve 45 will move the groove 46 out of registry with the balls 40 and the inner surface of the sleeve will hold the balls in the depressions 43, as illustrated in FIG. 5, to thereby lock the clutch in the engaged position where rotation of drive shaft 16 is transmitted to belt 18 to drive shaft 9a. Similarly, moving the shifting sleeve 45 to the left from the neutral position, as shown in FIG. 4, will move balls 40 into the depressions 42, as shown in FIG. 3, to thereby lock the clutch in the other engaged position in which rotation of the drive shaft is transmitted to the belt 19 to drive shaft 9b.

To move the shift sleeve 45 axially, a shaft 47 is mounted for rotation within a bearing 48 which is secured within the inner end of the sleeve. A hand lever 49 is pivoted to shaft 47 via a pivot pin 50, and movement of the lever 49 about pivot shaft 51 will move sleeve 45 axially to thereby shift the clutch. Through manual operation of the shift sleeve 45, clutch 17 can be moved between a disengaged position, as shown in FIG. 4, to a first engaged position, as shown in FIG. 5 where rotation of the drive shaft is transmitted through belt 19 to eccentric shaft 9b, and a second engaged position, as shown in FIG. 3, where rotation of the drive shaft is transmitted through belt 18 to eccentric shaft 9a.

With the construction of the invention only one of the belts 18 and 19 is engaged at any instant, so that only one of the eccentric shafts 9 is rotating at any time. As there are no opposing torques created by the eccentric shafts, the speed of travel of the compactor over the terrain is substantially increased for a given power input as compared to a conventional compactor.

As the shifting is accomplished via clutch 17, which is not in the vibrational zone, there is less wear on the shifting mechanism as compared to an arrangement in which the shift mechanism is associated directly with the eccentric vibrating shafts.

Due to the clutching mechanism, one of the belt drives is progressively tightened while the other is loosened, thus providing a smooth transition between forward and reverse speeds.

Various modes of carrying out the invention are contemplated as being within the scope of the following claims particularly pointing out and distinctly claiming the subject matter which is regarded as the invention.

I claim:

1. A reversible walk-behind vibratory compactor, comprising a frame, compaction means mounted on the frame and adapted to engage a material to be compacted, drive means mounted on the frame and including a drive shaft, a pair of eccentric shafts mounted for rotation on the frame, first connecting means for connecting the drive shaft with a first of said eccentric shafts for rotating said first eccentric shaft in a first direction, second connecting means for connecting said drive shaft with a second of said eccentric shafts for rotating said second eccentric shaft in the opposite direction, and clutch means operably connected to the drive shaft for selectively connecting each connecting means with said drive shaft for selectively rotating each eccentric shaft to provide forward and reverse movement for said compactor.

2. The compactor of claim 1, wherein said first and second connecting means comprise belt drives.

3. The compactor of claim 2, wherein each eccentric shaft includes a weight mounted eccentrically of the axis of the shaft.

4. The compactor of claim 2, wherein said clutch means has a first position where said drive shaft is engaged with a first of said belt drives and has a second position where said drive shaft is engaged with a second of said belt drives and has a third disengaged position where said drive shaft is out of engagement with both of said belt drives.

5. The compactor of claim 2, wherein said first belt drive comprises a belt having a generally V-shaped cross section and said second belt drive includes a belt having a generally hexagonal shape in cross section.

6. The compactor of claim 1, wherein said drive means comprises an engine, and resilient mounting means connecting the engine to the frame.

7. A reversible walk-behind vibratory soil compactor, comprising a frame, a compaction plate mounted on the frame and adapted to engage and compact a material, drive means mounted on the frame and including a rotatable drive shaft, a first eccentric shaft journaled for rotation on the frame, a second eccentric shaft disposed parallel to said first shaft and mounted for rotation on the frame, clutch means connected to said drive shaft, first belt drive means interconnecting said first eccentric shaft and said clutch means, second belt drive means connecting said second eccentric shaft and said clutch means, said first and second belt drive means being constructed and arranged such that said eccentric shafts are rotated in opposite directions, said clutch being constructed and arranged to selectively engage said drive shaft with said first and second belt drive means.

8. The compactor of claim 7, wherein said clutch means includes a first clutch member secured to said drive shaft, a second clutch member secured to said drive shaft and disposed in spaced fixed axial distance from said first clutch member, a third clutch member disposed between said first and second clutch members and slidably mounted on said drive shaft, and manually operated shifting means operably connected to said third clutch member for shifting said third clutch member between a first engaging position where it provides a driving engagement between said first clutch member and said first belt drive means and a second position where it provides a driving engagement between said second clutch member and said second belt drive means.

9. The compactor of claim 7, and including a mounting member to support said engine, and resilient mounting means connecting said mounting member and said frame for minimizing the transmission of vibrations from said frame to said engine.

10. The compactor of claim 1, wherein said eccentric shafts are disposed in parallel relation and are disposed normal to the direction of movement of said compactor.

* * * * *